US011238503B2

(12) United States Patent
Vigier et al.

(10) Patent No.: US 11,238,503 B2
(45) Date of Patent: Feb. 1, 2022

(54) BEACON TRIGGERED PROCESSES

(71) Applicant: Apple Inc., Cupertino, CA (US)

(72) Inventors: Benjamin Vigier, San Francisco, CA (US); Corey G. Fugman, Saratoga, CA (US); Filip Krsmanovic, Mountain View, CA (US); Yingfeng Su, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/417,520

(22) Filed: May 20, 2019

(65) Prior Publication Data

US 2019/0272567 A1 Sep. 5, 2019

Related U.S. Application Data

(62) Division of application No. 14/586,489, filed on Dec. 30, 2014, now Pat. No. 10,296,950.
(Continued)

(51) Int. Cl.
G06Q 30/00 (2012.01)
G06Q 30/02 (2012.01)
(Continued)

(52) U.S. Cl.
CPC ... G06Q 30/0281 (2013.01); G06Q 10/06311 (2013.01); H04W 4/021 (2013.01); H04W 4/70 (2018.02)

(58) Field of Classification Search
CPC ........ G06Q 30/0281; G06Q 10/06311; H04W 4/021; H04W 4/70
(Continued)

(56) References Cited

U.S. PATENT DOCUMENTS 6,002,918 A   12/1999 Heiman
6,816,730 B2  11/2004 Davies
(Continued)

FOREIGN PATENT DOCUMENTS

CN   102568335   7/2012
CN   102638610   8/2012
(Continued)

OTHER PUBLICATIONS

Mohd Zin, Mohd Shahril Izuan & Sazali, M.A. & Isa, A. & Mohamad Isa, Mohd Saari. (2015). Development of auto-notification application for mobile device using geofencing technique. Journal of Telecommunication, Electronic and Computer Engineering. 7. 169-173. (Year: 2015).*
(Continued)

Primary Examiner — Anand Loharikar
(74) Attorney, Agent, or Firm — Fish & Richardson P.C.

(57) ABSTRACT

Techniques and systems for beacon triggered processes are disclosed. A described technique includes causing a beacon device to broadcast a beacon message, the beacon device being within the vicinity of an establishment; detecting a presence of a user of a mobile device based on receiving from the mobile device a first message that is responsive to the beacon message; retrieving a transaction record based on a user or mobile device identifier in the first message; generating and transmitting a second message based on the transaction record to facilitate a completion of a transaction associated with the transaction record at the establishment; the second message being configured to provide notification of an arrival of the user and dispatch an employee to meet the user and handle the transaction; and generating and transmitting a third message based on the transaction record to facilitate the completion of the transaction at the mobile device.

16 Claims, 10 Drawing Sheets

Related U.S. Application Data

(60) Provisional application No. 62/057,583, filed on Sep. 30, 2014.

(51) Int. Cl.
   *G06Q 10/06* (2012.01)
   *H04W 4/021* (2018.01)
   *H04W 4/70* (2018.01)

(58) Field of Classification Search
   USPC .............................................. 705/26.1–27.2
   See application file for complete search history.

(56) References Cited

U.S. PATENT DOCUMENTS

| | | | |
|---|---|---|---|
| 7,010,267 B2 | 3/2006 | Vanluijt | |
| 7,397,424 B2 | 7/2008 | Houri | |
| 7,653,573 B2 | 1/2010 | Hayes | |
| 7,712,657 B1 | 5/2010 | Block | |
| 7,856,234 B2 | 12/2010 | Alizadeh-Shabdiz | |
| 7,890,116 B2 | 2/2011 | Salokannel | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,160,045 B1 | 4/2012 | Chhabra | |
| 8,223,074 B2 | 7/2012 | Alizadeh-Shabdiz | |
| 8,239,276 B2 | 8/2012 | Lin et al. | |
| 8,254,414 B2 | 8/2012 | Sakoda | |
| 8,369,264 B2 | 2/2013 | Bracket et al. | |
| 8,478,297 B2 | 7/2013 | Morgan et al. | |
| 8,626,135 B1 | 1/2014 | Schilit et al. | |
| 8,645,213 B2 | 2/2014 | Granbery | |
| 8,831,642 B2 | 9/2014 | Moldavsky | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Bracket et al. | |
| 9,020,687 B2 | 4/2015 | Mendelson | |
| 9,204,251 B1 | 12/2015 | Mendelson | |
| 9,204,257 B1 | 12/2015 | Mendelson | |
| 9,317,867 B2 | 4/2016 | Johnson | |
| 9,426,615 B2 | 8/2016 | Vigier et al. | |
| 9,456,416 B2 | 9/2016 | Vigier et al. | |
| 10,210,561 B2 | 2/2019 | Vigier | |
| 10,278,197 B2 | 4/2019 | Vigier et al. | |
| 10,664,856 B2 | 5/2020 | Robbin | |
| 2003/0098892 A1 | 5/2003 | Hiipakka | |
| 2003/0200489 A1 | 10/2003 | Hars | |
| 2006/0104600 A1 | 5/2006 | Abrams | |
| 2006/0173790 A1 | 8/2006 | Park et al. | |
| 2006/0180664 A1 | 8/2006 | Barrett et al. | |
| 2008/0154735 A1 | 6/2008 | Carlson | |
| 2010/0150122 A1 | 6/2010 | Berger et al. | |
| 2010/0174599 A1 | 7/2010 | Rosenblatt et al. | |
| 2010/0198614 A1 | 8/2010 | Chopra et al. | |
| 2010/0287052 A1 | 11/2010 | Minter | |
| 2011/0028160 A1 | 2/2011 | Roeding et al. | |
| 2011/0060652 A1 | 3/2011 | Morton | |
| 2011/0178863 A1 | 7/2011 | Daigle | |
| 2011/0238514 A1* | 9/2011 | Ramalingam | G06Q 20/10 705/21 |
| 2011/0238517 A1 | 9/2011 | Ramalingam et al. | |
| 2011/0319072 A1 | 12/2011 | Ekici | |
| 2011/0320293 A1 | 12/2011 | Khan | |
| 2012/0042036 A1 | 2/2012 | Lau et al. | |
| 2012/0064855 A1 | 3/2012 | Mendelson | |
| 2012/0101951 A1 | 4/2012 | Li et al. | |
| 2012/0290336 A1 | 11/2012 | Rosenblatt et al. | |
| 2012/0296686 A1 | 11/2012 | Fugman et al. | |
| 2013/0032634 A1 | 2/2013 | Mckirdy | |
| 2013/0046602 A1 | 2/2013 | Grigg | |
| 2013/0094536 A1 | 4/2013 | Hui | |
| 2013/0099920 A1 | 4/2013 | Song | |
| 2013/0110728 A1 | 5/2013 | Kobres et al. | |
| 2013/0117084 A1 | 5/2013 | Rooke et al. | |
| 2013/0128786 A1 | 5/2013 | Sultan et al. | |
| 2013/0159027 A1 | 6/2013 | Naor et al. | |
| 2013/0193201 A1 | 8/2013 | Bradley et al. | |
| 2013/0210360 A1 | 8/2013 | Ljung et al. | |
| 2013/0212017 A1 | 8/2013 | Bangia | |
| 2013/0281084 A1 | 10/2013 | Batada et al. | |
| 2013/0290106 A1 | 10/2013 | Bradley et al. | |
| 2013/0290718 A1 | 10/2013 | Zhuang et al. | |
| 2013/0297422 A1 | 11/2013 | Hunter | |
| 2013/0316725 A1 | 11/2013 | MacGougan et al. | |
| 2014/0025232 A1 | 1/2014 | Cuddihy | |
| 2014/0025504 A1 | 1/2014 | Butler et al. | |
| 2014/0058812 A1 | 2/2014 | Bender et al. | |
| 2014/0058897 A1 | 2/2014 | Yang | |
| 2014/0064166 A1 | 3/2014 | HomChaudhuri | |
| 2014/0081720 A1 | 3/2014 | Wu | |
| 2014/0089061 A1 | 3/2014 | Vitale | |
| 2014/0108149 A1 | 4/2014 | Jabara et al. | |
| 2014/0135042 A1 | 5/2014 | Buchheim | |
| 2014/0136312 A1 | 5/2014 | Saksena et al. | |
| 2014/0143139 A1 | 5/2014 | Koplovitz | |
| 2014/0154984 A1 | 6/2014 | Perrin et al. | |
| 2014/0207614 A1 | 7/2014 | Ramaswamy | |
| 2014/0207682 A1 | 7/2014 | Wolfond | |
| 2014/0214598 A1 | 7/2014 | Acker, Jr. et al. | |
| 2014/0236478 A1 | 8/2014 | Mermeistein | |
| 2014/0274150 A1 | 9/2014 | Marti et al. | |
| 2014/0324627 A1 | 10/2014 | Haver et al. | |
| 2014/0324994 A1 | 10/2014 | Sun | |
| 2014/0342760 A1 | 11/2014 | Moldavsky et al. | |
| 2014/0358835 A1 | 12/2014 | Marti | |
| 2015/0063323 A1 | 3/2015 | Sadek et al. | |
| 2015/0079942 A1 | 3/2015 | Kostka et al. | |
| 2015/0120509 A1* | 4/2015 | Moring | G06Q 30/0635 705/26.81 |
| 2015/0140982 A1 | 5/2015 | Postrel | |
| 2015/0235486 A1 | 8/2015 | Ellis et al. | |
| 2015/0278864 A1 | 10/2015 | McDevitt | |
| 2015/0281302 A1 | 10/2015 | Winston et al. | |
| 2015/0289207 A1 | 10/2015 | Kubo et al. | |
| 2015/0294517 A1 | 10/2015 | Herrala | |
| 2015/0339694 A1 | 11/2015 | Robbin et al. | |
| 2016/0092943 A1 | 3/2016 | Vigier et al. | |
| 2016/0092966 A1 | 3/2016 | Vigier et al. | |
| 2016/0094940 A1 | 3/2016 | Vigier et al. | |
| 2016/0095063 A1 | 3/2016 | Vigier et al. | |
| 2016/0148270 A1 | 5/2016 | Vigier et al. | |
| 2016/0353463 A1 | 12/2016 | Vigier et al. | |
| 2019/0180346 A1 | 6/2019 | Vigier et al. | |

FOREIGN PATENT DOCUMENTS

| | | |
|---|---|---|
| EP | 2693384 | 2/2014 |
| EP | 2733502 | 5/2014 |
| WO | WO 2001057758 | 9/2001 |
| WO | WO 2014130958 | 8/2014 |

OTHER PUBLICATIONS

International Search Report and Written Opinion in International Application No. PCT/US2015/048652, dated Nov. 2, 2015, 15 pages.

Sean Hargrave, "Apple pay and iBeacons—A Digital marketing Revolution Could Be on Its Way", London Media Advertising Daily, http://www.mediapost.com/publications/article/233982/apple-pay-and-ibeacons-a-digital-marketing-revo.htlm, Sep. 11, 2014, 3 pages.

Digital-download kiosks in store for retail, other verticals. (Jun. 24, 2009). Retrieved from https://www.kioskmarketplace.com/articles/digital-download-kiosks-in-store-for-retail-other-certicals-2/ (Year: 2009).

Wired.com [online], "Sci-Fi Future: Samsung Introduces Interactive Posters Alongside New Phone," Jun. 28, 2012, retrieved on Feb. 1,

(56) References Cited

OTHER PUBLICATIONS 2021, retrieved from URL <https://www.wired.com/2012/06/samsung-sci-fi-future/>, 3 pages.

* cited by examiner

BEACON TRIGGERED PROCESSES

CROSS REFERENCE TO RELATED APPLICATIONS

This application is a division of and claims priority to U.S. patent application Ser. No. 14/586,489, filed Dec. 20, 2014, which claims the benefit of the priority of U.S. Provisional Patent Application No. 62/057,583, filed on Sep. 30, 2014. The above-identified applications are incorporated herein by reference in their entirety.

TECHNICAL FIELD

This disclosure relates generally to radio frequency (RF) beacons.

BACKGROUND

Many modern mobile devices (e.g., a smart phone, tablet computer, wearable computer) include one or more radio frequency receivers, transmitters, or transceivers that allow one-way or two-way communications with other devices. For example, a mobile device can use a transceiver to communicate with a server on the Internet via a base station of a wireless network. In another example, a mobile device can include a receiver to receive low powered RF signals from devices such as RF beacons.

SUMMARY

Techniques and systems for beacon triggered processes including a beacon triggered message exchange are disclosed. A beacon-equipped business establishment can operate beacon devices to broadcast beacon messages over a short-range communication link. Reception of such messages can trigger one or more processes to enhance a customer's experience with the business establishment via the customer's mobile device. Running on a customer's mobile device, an application for interacting with a beacon-equipped business establishment can be configured to receive beacon messages from the establishment and intelligently determine whether to trigger a background process based on the message reception. For example, in a beacon-equipped business establishment, such as a retail store, an initial "welcome" beacon message may be received by a customer's mobile device from a beacon device located near an entrance of the establishment. A reception of such a beacon message over a short-range communication link can indicate that the customer is near or has entered the business establishment.

Beacon message reception can trigger a background process on the customer's mobile device, where the background process can perform a message exchange with the business establishment. In some implementations, the background process can determine whether there is a pre-existing reason for visiting the business establishment by analyzing the customer's activities before arriving to the establishment. Analyzing the customer's activities can include determining whether the mobile device user has ordered a product for an in-store pick-up, scheduled an in-store consultation or service appointment, or scheduled a repair drop-off/pick-up. If there is a pre-existing reason, the background process can perform a message exchange with the business establishment.

The message exchange can cause the business establishment to prepare for arrival of the customer. Further, the message exchange can provide information to the customer such as instructions for product pick-up or in-store directions to reach the customer service desk. In some implementations, the business establishment can assign an employee to assist the customer based on the message exchange. In some implementations, the business establishment can send an image of the assigned employee to the customer's mobile device such that the customer can readily identify and approach the assigned employee.

A technique for a beacon triggered process can include causing a beacon device to broadcast a beacon message, the beacon device being within the vicinity of an establishment; detecting a presence of a user of a mobile device based on receiving from the mobile device a first message that is responsive to the beacon message, the first message including a user or mobile device identifier; retrieving a transaction record based on the user or mobile device identifier; generating a second message based on the transaction record to facilitate a completion of a transaction associated with the transaction record at the establishment; transmitting the second message to a notification device that is within the vicinity of the establishment, the second message being configured to provide notification of an arrival of the user of the mobile device and dispatch an employee of the establishment to meet the user and handle the transaction at the establishment; generating a third message based on the transaction record to facilitate the completion of the transaction associated with the transaction record at the mobile device; and transmitting the third message to the mobile device. Other implementations are directed to systems, devices and computer-readable, storage mediums.

These and other implementations can include one or more of the following features. Implementations can include assigning the employee to facilitate the completion of the transaction associated with the transaction record, and retrieving an image of the employee based on an employee identifier that corresponds to the employee. The third message can include at least a portion of the image. Implementations can include generating barcode data that corresponds to the transaction record. The third message can include the barcode data. In some implementations, the third message includes customer instructions for completing the transaction. In some implementations, the third message includes status information associated with the transaction record. In some implementations the transaction record includes a product identifier, and the second message includes the product identifier. In some implementations, the second message includes employee instructions for completing the transaction, the employee instructions including instructions for obtaining a product corresponding to the product identifier, providing the product to the user, or both. In some implementations, the transaction record includes appointment information. In some implementations, the transaction record includes a service identifier, and the second message includes the service identifier.

A beacon-based system can include a beacon device configured to broadcast a beacon message, the beacon device being within the vicinity of an establishment; a notification device configured to present one or more notifications; and a server configured to perform operations. The operations can include detecting a presence of a user of a mobile device based on receiving from the mobile device a first message that is responsive to the beacon message, the first message including a user or mobile device identifier; retrieving a transaction record based on the user or mobile device identifier; generating a second message based on the transaction record to facilitate a completion of a transaction associated with the transaction record at the establishment; transmitting the second message to the notification device, the second message being configured to provide notification of an arrival of the user of the mobile device and dispatch an employee of the establishment to meet the user and handle the transaction at the establishment; generating a third message based on the transaction record to facilitate the completion of the transaction associated with the transaction record at the mobile device; and transmitting the third message to the mobile device.

A technique for a beacon triggered process performed by a mobile device can include receiving, at the mobile device, a beacon message from a beacon device, the beacon device being within the vicinity of an establishment; generating a first message in response to receiving the beacon message, the first message including a user or mobile device identifier; transmitting, from the mobile device, the first message to a server computer outside the vicinity of the establishment, the first message being configured to cause the establishment to dispatch an employee to prepare for an arrival of a user of the mobile device and handle a transaction associated with the user or mobile device identifier; receiving, at the mobile device, a second message that is responsive to the first message, the second message including information to facilitate a completion of the transaction; and presenting the information through the mobile device. Other implementations are directed to systems, devices and computer-readable, storage mediums.

These and other implementations can include one or more of the following features. In some implementations, the presented information includes an image of an employee that is assigned to facilitate the completion of the transaction, and presenting the information includes displaying at least a portion of the image. In some implementations, the presented information includes barcode data, and presenting the information includes displaying a barcode based on the barcode data to verify an identity of a user associated with the mobile device. In some implementations, the presented information includes customer instructions for completing the transaction, and presenting the information includes displaying the customer instructions. In some implementations, the beacon message includes a beacon identifier, and the first message includes at least a portion of the beacon identifier. Implementations can include performing a determination of whether there is a pre-existing reason for a visit to the establishment by querying one or more sources on the mobile device. Generating the first message can be conditional on an outcome of the determination.

A system for providing beacon-based applications can include a network interface configured to communicate with mobile devices; and processor electronics configured to store applications, including an application, for download to the mobile devices via the network interface. The application can include instructions to cause a mobile device to perform operations. The operations can include receiving a beacon message from a beacon device, the beacon device being within the vicinity of an establishment; generating a first message in response to receiving the beacon message, the first message including a user or mobile device identifier; transmitting the first message to a server computer outside the vicinity of the establishment, the first message being configured to cause the establishment to dispatch an employee to prepare for an arrival of a user of the mobile device and handle a transaction associated with the user or mobile device identifier; receiving a second message that is responsive to the first message, the second message including information to facilitate a completion of the transaction; and presenting the information through the mobile device.

Particular implementations disclosed herein provide one or more of the following advantages. A beacon triggered message exchange can give advance notice of a customer's arrival to a business establishment. The advance notice can give the business establishment a head-start to prepare for the customer's arrival. In some implementations, such a head-start can expedite the completion of a customer's transaction. A beacon triggered message exchange can give the customer information that is tailored to his needs, e.g., customized instructions for an in-store pick or appointment or a headshot image of an employee that will help the customer, which can enhance the customer's experience with the business establishment.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
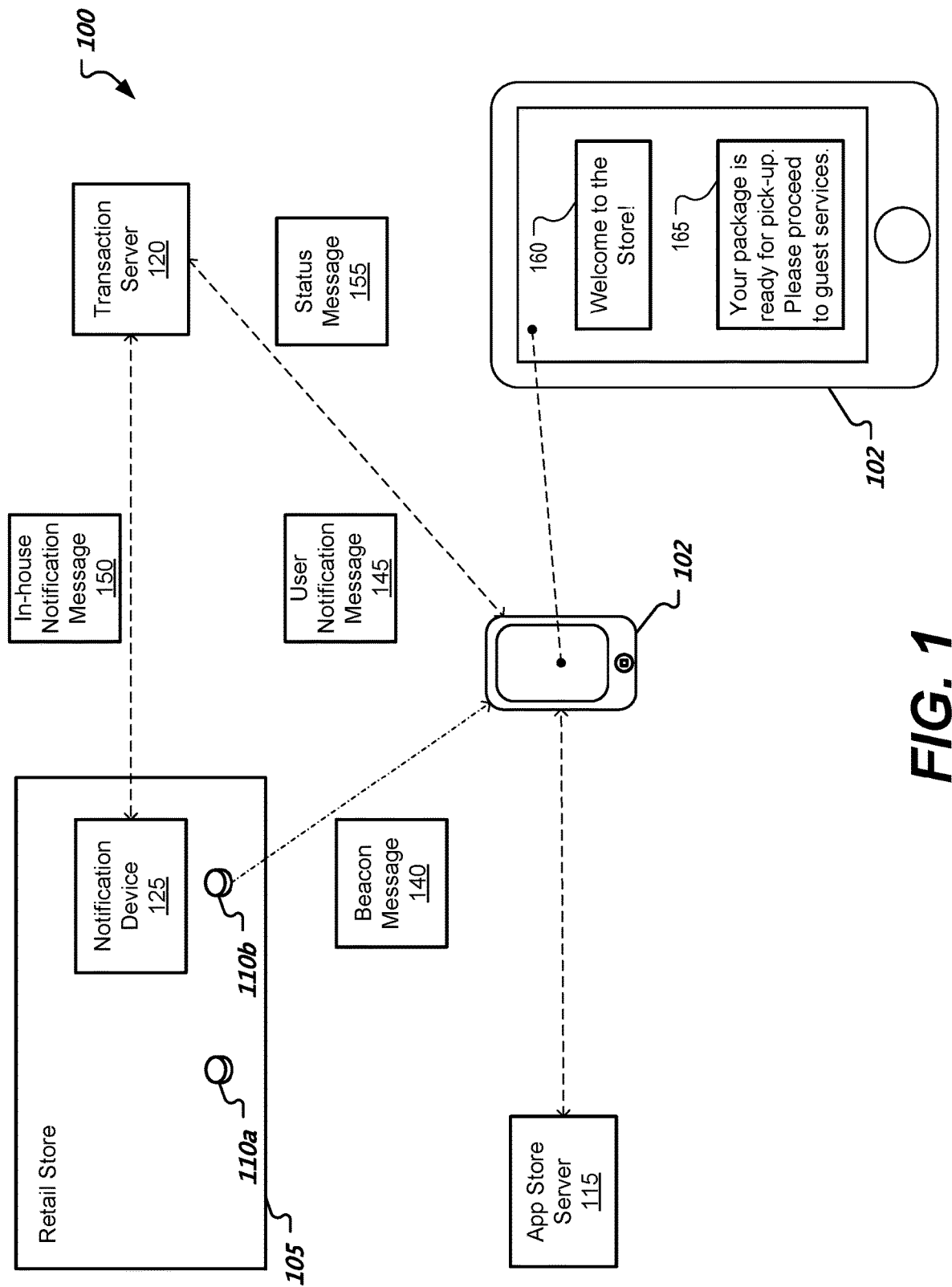
FIG. 1 is a plan view of an example operating environment for a beacon triggered message exchange.

FIG. 1 is a plan view of an example operating environment 100 for a beacon triggered message exchange. In the example shown, operating environment 100 is a business establishment, such as a retail store 105, which includes beacon devices 110*a-b*. The beacon devices 110*a-b* can broadcast a beacon message 140 to devices such as a mobile device 102, using a short-range communication link. A reception of the beacon message 140 by the mobile device 102 can indicate that the user of the mobile device 102 has entered or is about to enter the retail store 105. In some implementations, a retail store application running on the mobile device 102 can initiate a customer service process within the operating environment 100 in response to receiving the beacon message 140. In this example, the user of the mobile device 102 has ordered a product and selected an in-store pick-up option. Thus for this example, the customer service process can include alerting an employee in the retail store 105 about the arrival of the user and providing a package or product identifier to the employee such that the corresponding package or product is retrieved and made ready for pick-up. Although the example environment 100 is described herein as a retail store, the described features and processes are applicable to any beacon-equipped environment, including museums, sports arenas, restaurants and the like. In some implementations, the retail store application interacts with an operating system of the mobile device to perform the various processes described herein, and in such implementations an operating system is considered to be an application. In some implementations, the retail store application can be downloaded from an application store server 115. The retail store application can be configured to communicate with one or more servers of a server system associated with the retail store 105. The server system can include a transaction server 120 and a notification device 125.

The beacon devices 110a-b can be configured (locally or remotely over a network) to broadcast messages that provide information related to the retail store 105 or events (e.g., advertising campaigns) occurring at the retail store 105. One or more of the beacon devices 110a-b can broadcast a beacon message 140. In some implementations, a beacon message includes a message number that the retail store application can map to content such as a text string for display on a screen of the mobile device 102. In some implementations, the content (e.g., a database table) can be downloaded from a network-based server computer to the mobile device before the user enters the retail store 105.

In response to the beacon message 140, the retail store application running on the mobile device 102 can display the beacon message in a notification window 160 on a screen of the mobile device 102. Further, the retail store application can initiate a customer service process by transmitting a user notification message 145 to a transaction server 120. The user notification message 145 can include a user identifier associated with the user of the mobile device 102. In some implementations, the user notification message 145 can include a mobile device identifier. In some implementations, a mobile device identifier can be linked to a user account. In some implementations, the user notification message 145 can include a store identifier that is associated with the retail store 105. In some implementations, the store identifier is or included within a beacon identified included in the beacon message 140. In this example, the user identifier in the user notification message 145 is further associated with a purchase order. The transaction server 120 can perform a database query to retrieve a transaction record such as a purchase order associated with the user identifier. In some implementations, a user notification message 145 can be configured to cause the business establishment to dispatch an employee to prepare for an arrival of the mobile device user and handle a transaction associated with the user.

To prepare for the customer's arrival, the transaction server 120 can transmit an in-house notification message 150 to a notification device 125 residing in the retail store 105. In some implementations, the transaction server 120 services multiple locations of a business establishment, and can use a store identifier included in the user notification message 145 to determine a specific location of the business establishment, and accordingly, a notification device 125 that is associated with that location. The in-house notification message 150 can include information such as the user identifier, the purchase order, one or more product identifiers in the purchase order, and/or a package identifier. In some implementations, the notification device 125 is a tablet computer running a customer relationship management application that is in communication with the transaction server 120. The notification device 125 can generate an in-store notification (e.g., audio, visual, or force feedback) in response to the in-house notification message 150 such that an employee can take appropriate actions, e.g., retrieve a product identified by a product identifier included in the in-house notification message 150. The transaction server 120 can send a status message 155 to the mobile device 102 to inform its user that a package is ready for pick-up. In response to the status message 155, the retail store application running on the mobile device 102 can display content from the status message 155 in a notification window 165 on a screen of the mobile device 102. The notification window 165 can display a text string containing customer instructions (e.g., "Your package is ready for pick-up. Please proceed to guest services").

Devices such as the beacon devices 110a-b and the mobile device 102 can use a short-range radio technology such as Bluetooth™ or a near field communication (NFC) technology for broadcasting and/or receiving beacon messages. In some implementations, the beacon devices 110a-b can use a specific type of Bluetooth™ called Bluetooth™ low energy (BLE). A wireless communication range of the beacon devices 110a-b can be between 10 to 30 meters. Other ranges are possible. When a mobile device 102 is within a wireless communication range of a beacon device 110a-b, it can receive a corresponding beacon message.

Various examples of mobile device 102 include smartphones, tablet computers, notebook computers, or wearable computers. In some implementations, the mobile device 102 can include a wireless receiver or transceiver that can scan the environment 100 for beacon messages from other devices, such as beacon devices 110a-b, in the environment 100. For example, a mobile device 102 can include a BLE receiver that scans for beacon messages. Over a long-range communication link, the mobile device 102 can communicate with servers through a base station of a wireless network such as one based on Long Term Evolution (LTE), Code Division Multiple Access (CDMA), e.g., CDMA2000 and Wideband CDMA (WCDMA), or an IEEE 802.11 wireless standard. Other types of wireless networks are possible. In some implementations, a mobile device 102 can be configured to be a beacon device. Various examples of a notification device 125 include smartphones, tablet computers, notebook computers, or wearable computers. In some implementations, a notification device 125 is a server.

Figure 2:
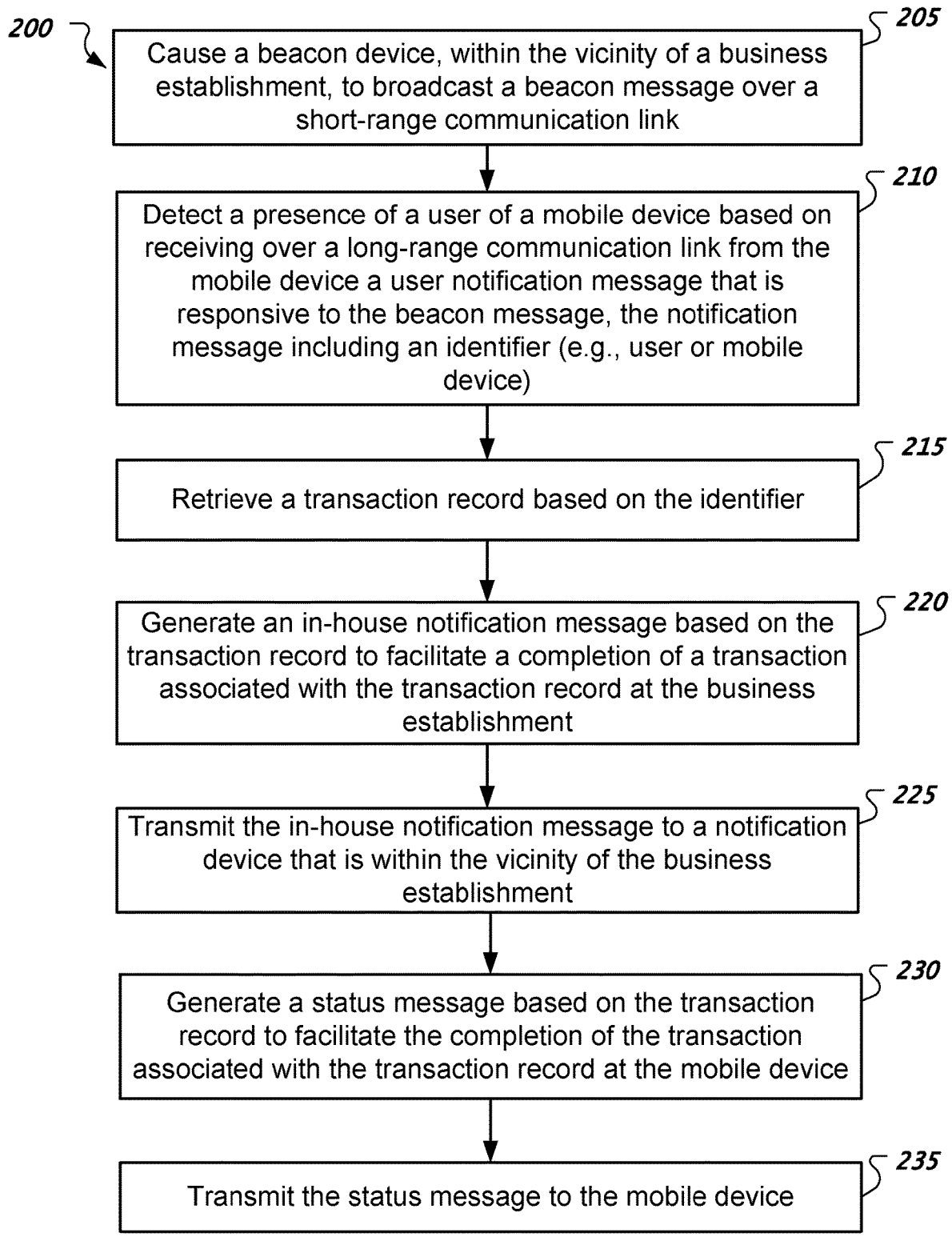
FIG. 2 illustrates an example process performed by a server system that uses beacon messages to trigger a message exchange.

FIG. 2 illustrates an example process 200 performed by a server system that uses beacon messages to trigger a message exchange. In some implementations, the process 200 can begin by causing a beacon device, within the vicinity of a business establishment, to broadcast a beacon message over a short-range communication link (205). Causing a beacon device to broadcast a beacon message can include programming the beacon device with one or more beacon message parameters such as a beacon identifier and a beacon message field. Causing a beacon device to broadcast a beacon message can include sending a start broadcast command to the beacon device.

The process 200 can include detecting a presence of a user of a mobile device based on receiving over a long-range communication link from the mobile device a user notification message that is responsive to the beacon message, the notification message including an identifier (210). In some implementations, the notification message can include an identifier such as a user identifier. In some implementations, a user identifier can be associated with a username that is entered into a retail store application to gain access to a user's account with the business establishment. In some implementations, the notification message can include an identifier such as a mobile device identifier. In some implementations, the user notification message can include a beacon identifier of the beacon message. In some implementations, the user notification message can include a store identifier that is associated with the beacon message.

The process 200 can include retrieving a transaction record based on the identifier (215). Retrieving a transaction record can include querying a transaction database using the identifier, such as a user or mobile device identifier, to access one or more records that are associated with the user identifier. Various examples of transaction records include product orders, service orders, or appointments. Other types of transaction records are possible.

The process 200 can include generating an in-house notification message based on the transaction record to facilitate a completion of a transaction associated with the transaction record at the business establishment (220). In some implementations, the in-house notification message can be configured to provide notification of an arrival of a user of the mobile device. In some implementations, the in-house notification message can be configured to dispatch an employee of the business establishment to meet the user and handle the transaction at the business establishment. In some implementations, dispatching an employee to meet the user can include informing customer service department personnel to prepare for an arrival of a customer. In some implementations, the in-house notification message can include employee instructions for completing the transaction. Employee instructions, for example, can include instructions for obtaining a product corresponding to a product identifier, providing the product to the mobile device user, or both. Instructions for obtaining a product can specify a location of a bin within a stockroom that contains the product. In some implementations, instructions for providing the product to the mobile device user can include an authorization to allow an employee to dispense a product. In some implementations, the in-house notification message can include information such as the user identifier and details associated with the transaction record such as one or more product identifiers, one or more package identifiers, and/or one or more service identifiers.

The process 200 can include transmitting the in-house notification message to a notification device that is within the vicinity of the business establishment (225). In some implementations, a business may have multiple locations and each location can have one or more notification devices. The process 200 can select a location by using a store identifier in the user notification message, and further select a notification device that is associated with the selected location. The process 200 can retrieve a network address corresponding to the selected notification device and transmit the in-house notification message to the selected notification device.

The process 200 can include generating a status message based on the transaction record to facilitate the completion of the transaction associated with the transaction record at the mobile device (230). The status message can include instructions for the mobile device user to complete the transaction, e.g., instructions for order pick-up, instructions for obtaining service, instructions associated with an appointment, order status, or a combination thereof. In some implementations, the status message can include a barcode image to present to an employee to verify an identity of the mobile device user. In some implementations, the status message can include an image of employee that is assigned by the process 200 to help the mobile device user to complete the transaction. The process 200 can include transmitting the status message to the mobile device (235).

Figure 3A:
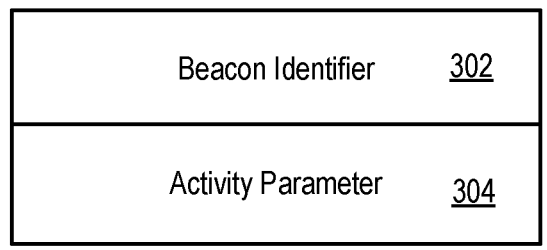
FIGS. 3A, 3B, and 3C illustrate different examples of beacon message formats.
Figure 3B:
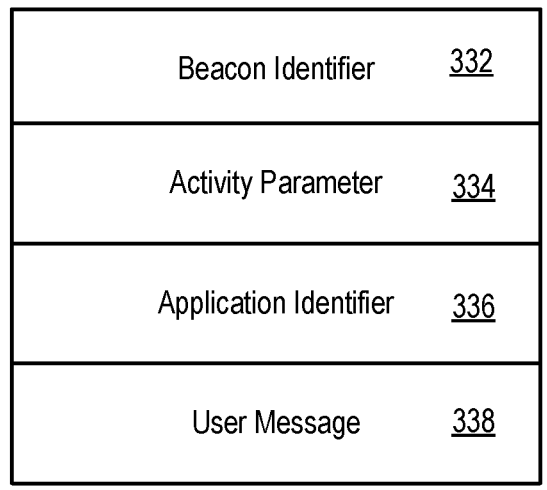
Figure 3C:
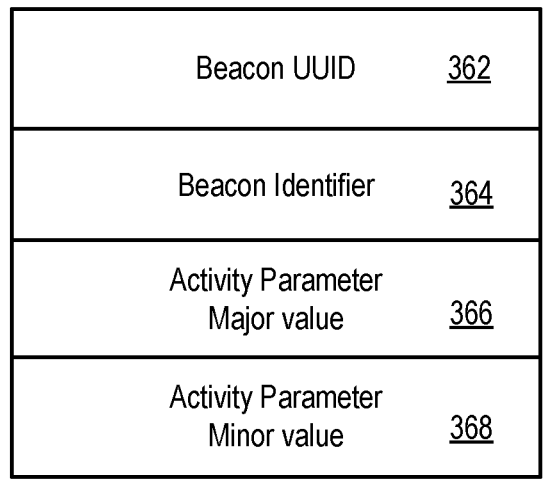

FIGS. 3A, 3B, and 3C illustrate different examples of beacon message formats. In FIG. 3A, the format 300 includes a beacon identifier 302 and an activity parameter 304. A beacon identifier 302 can include a text string such as "store_no_3954" or a hexadecimal value such as "0x0e33de54." Other types of identifiers are possible. In some implementations, the activity parameter 304 can include an action value or string. In some implementations, the activity parameter 304 can include a message value or string. Other types of activity parameters are possible. In some implementations, the activity parameter 304 can specify a check-in action type in order for a receiver of the beacon message to trigger a message exchange.

In FIG. 3B, the format 330 includes a beacon identifier 332, activity parameter 334, application identifier 336, and a user message 338. The application identifier 336 can identify an application running on the mobile device for handling the beacon message upon reception at a mobile device. For example, an operating system running on the mobile device can use the application identifier 336 to forward the beacon message to an application corresponding to the application identifier 336. In some implementations, if the application is not already installed on the mobile device, a browser can be launched on the mobile device and direct the user (e.g., using a URL) to a website where the user can download and install the application corresponding to the application identifier 336. In some implementations, the application can be downloaded automatically without user intervention in a manner that is transparent to the user (e.g., as a background process). In some implementations, if the application is installed but not running on the mobile device, the application can be launched automatically by the operating system running on the mobile device to receive the beacon message.

In FIG. 3C, the format 360 includes a beacon universally unique identifier (UUID) 362, beacon identifier 364, activity parameter major value 366, and activity parameter minor value 368. A venue can include multiple beacon devices having the same beacon identifier 364. However, such beacons can have different values for the beacon UUID 362. Thus, the beacon UUID 362 can serve to differentiate among beacon devices sharing the same beacon identifier 364. In some implementations, the beacon identifier 364 includes the beacon UUID 362. In some implementations, the UUID 362 is a 128-bit value.

An activity parameter can be split between a major value 366 and a minor value 368. In some implementations, the major value 366 and a minor value 368 are different 16-bit portions of a 32-bit value. In some implementations, the minor value 368 specifies a subtype from a group associated with the major value 366. For example, the major value 366 can specify a value associated with displaying user messages, and the minor value 368 can specify which user message to display.

In some implementations, an application running on a mobile device can process the major value 366 and the minor value 368 based on an internal database that associates major and minor values with specific actions. In some implementations, the internal database includes information from a JavaScript Object Notation (JSON) based file or data stream containing attribute—value pairs, e.g., one or more records containing a beacon identifier, major value, minor value, and an action-response such as a text string for displaying to a user. For example, a JSON based file can include the following text:

```
{
    "beaconUUID": "B3F56DB5-EFFB-58D2-C060-C0F5F81096E5",
    "beaconIdentifier": "com.retailstore_no_3954",
    "beacons": [{
        "major": 1,
        "minor": 99,
        "action": "message",
        "url": "",
        "message": {
            "en": "Welcome to the Store!"}
    }, {
        "major": 3,
        "minor": 2,
        "action": "check-in process",
        "url": "https://retailstore.com/us/check-in",
        "message": {
            "en": "Want to check in to the store? Click on link to proceed"}
    }]
}
```

This example JSON file snippet includes different actions associated with different major and minor values for a beacon UUID and identifier pair. Based on receiving a major and minor value from the beacon device associated with the beacon UUID and identifier pair, a mobile device would perform the action associated with the corresponding major and minor value entry within the JSON file.

Figure 4:
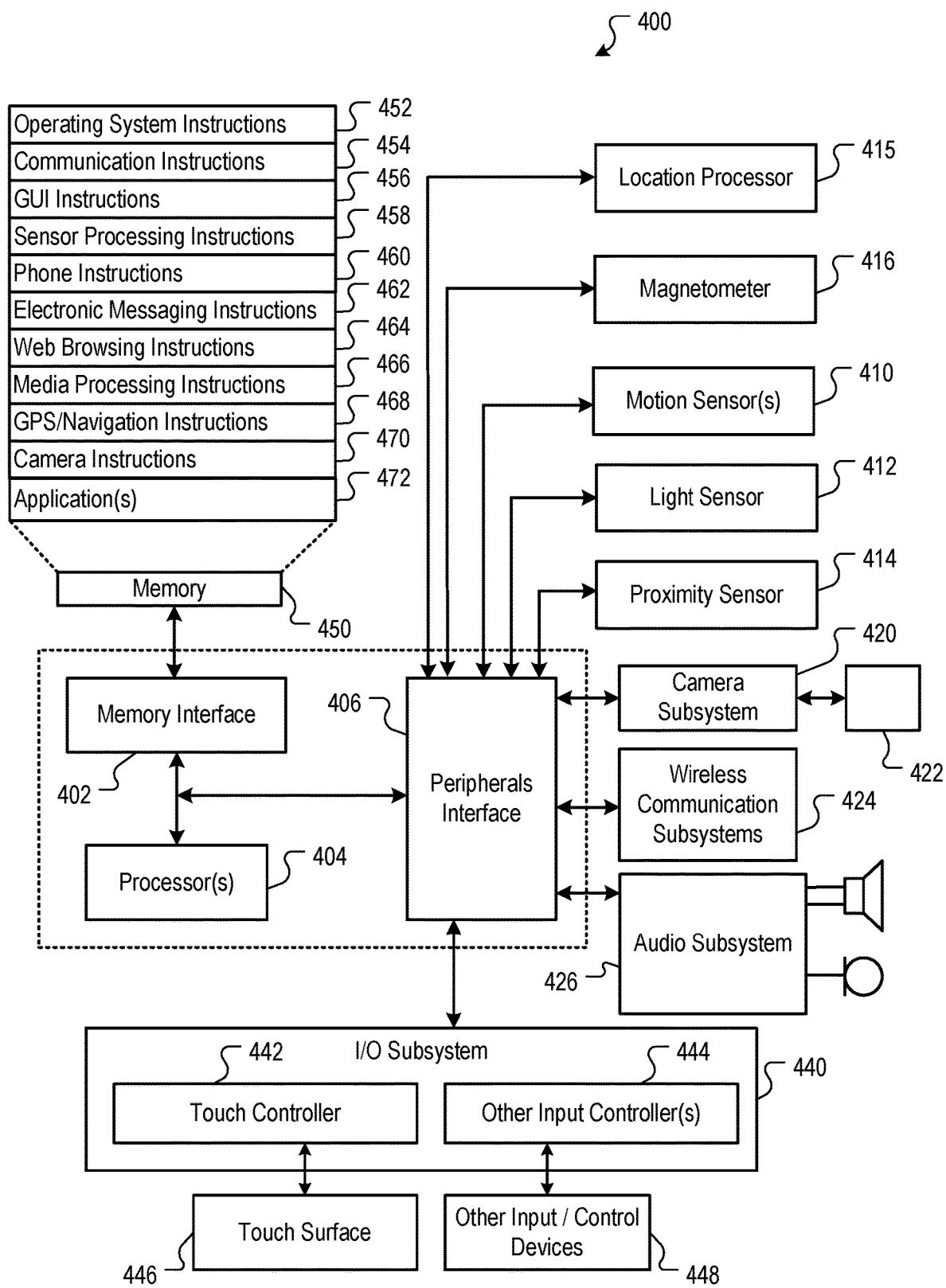
FIG. 4 is a block diagram of example mobile device architecture.

FIG. 4 is a block diagram of example mobile device architecture. The architecture may be implemented in any device 400 for generating the features described in this specification, including but not limited to portable computers, smart phones and electronic tablets, game consoles, wearable devices and the like. Device 400 may include memory interface 402, data processor(s), image processor(s) or central processor(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape). Other sensors may also be connected to peripherals interface 406, such as a temperature sensor, a biometric sensor, or other sensing device, to facilitate related functionalities. Location processor 415 (e.g., GPS receiver chip) may be connected to peripherals interface 406 to provide geo-positioning. Electronic magnetometer 416 (e.g., an integrated circuit chip) may also be connected to peripherals interface 406 to provide data that may be used to determine the direction of magnetic North. Thus, electronic magnetometer 416 may be used as an electronic compass. Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips. Audio subsystem 426 may be coupled to a speaker 428 and one or more microphones 430 to facilitate voice-enabled functions, such as voice recognition, voice replication, digital recording, and telephony functions.

Communication functions may be facilitated through one or more communication subsystems 424. Communication subsystems 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystems 424 may depend on the communication network(s) or medium(s) over which the device 400 is intended to operate. For example, a device may include wireless communication subsystems designed to operate over LTE, GSM, a GPRS network, an enhanced data GSM environment (EDGE) network, IEEE 802.11 communication networks (e.g., Wi-Fi), CDMA networks, NFC and a Bluetooth™ network. Communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and application storage 472 for storing applications, such as a retail store application that is configured to receive and prioritize beacon messages. In some implementations, such applications can be pre-installed on the device 400, downloaded from an application store server, or a combination thereof. The retail store application can include a rules-based engine that processes beacon messages according to one or more rule sets.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

Figure 5:
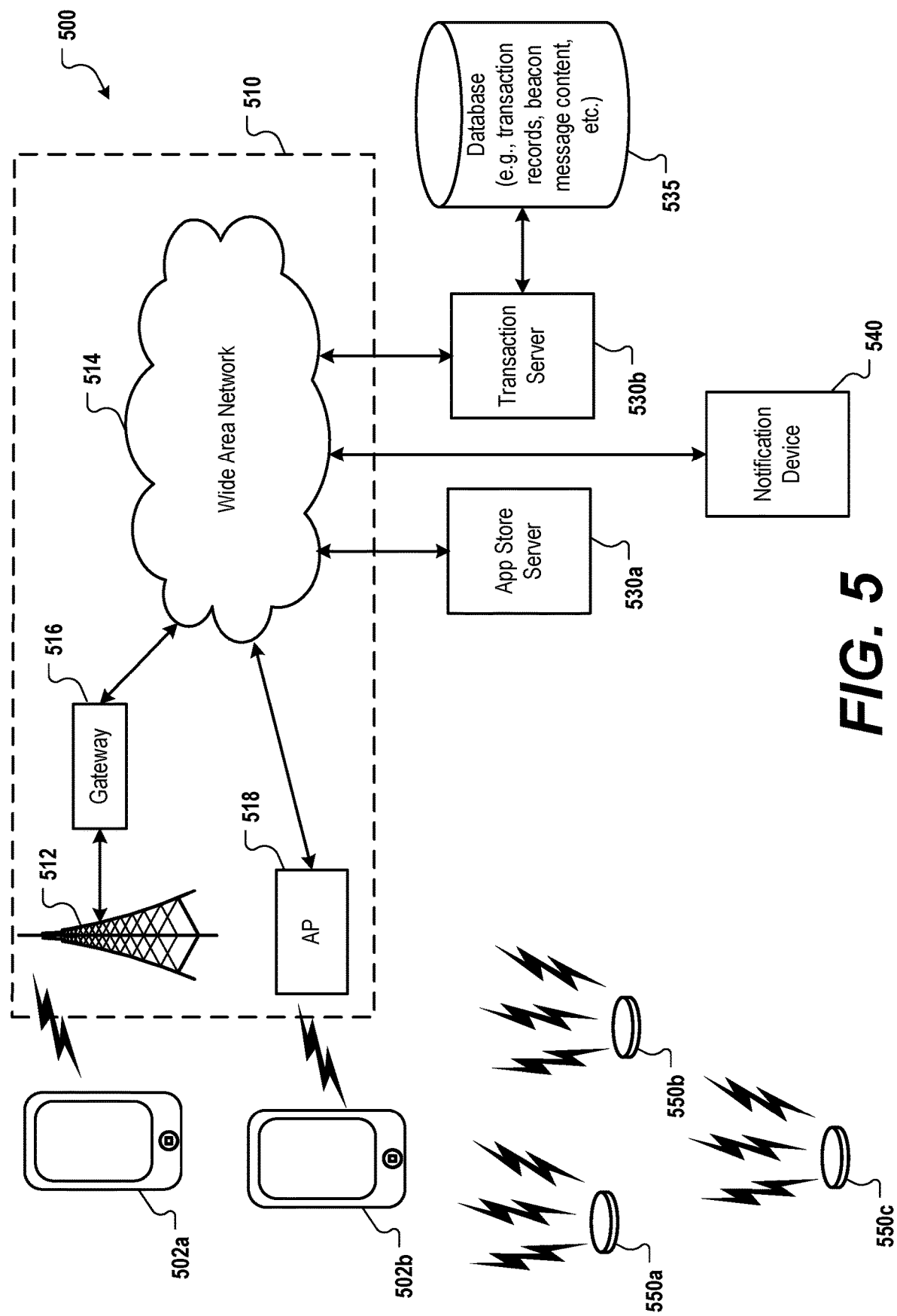
FIG. 5 illustrates an example operating environment for a beacon triggered message exchange.

FIG. 5 illustrates an example operating environment 500 for a beacon triggered message exchange. Mobile devices 502*a-b*, for example, can communicate over one or more wireless networks with one or more devices, e.g., servers 530*a-b* and notification device 540, that can be associated with a business establishment of the operating environment 500. For example, a base station 512 of a wireless network, e.g., a cellular network, can communicate with a wide area network (WAN) 514, such as the Internet, by use of a gateway 516. Likewise, an access point (AP) 518, such as an IEEE 802.11 family based wireless access point, can provide communication access to the wide area network 514. The mobile device 502*a-b* can, for example, communicate with one or more servers 530*a-b* via the base station 512, access point 518, or combination thereof.

Mobile devices 502*a-b* can receive beacon messages over a short-range communication link from a beacon device 550*a-c*. In some implementations, the short-range communication link can be based on BLE radio technology. In some implementations, the short-range communication link can be based on NFC radio technology. In some implementations, the mobile devices 502*a-b* can be configured to continuously scan for beacon messages. In some implementations, the mobile devices 502*a-b* can be configured to scan for beacon messages for a predetermined time period based on an application invoking a beacon scan API.

In some implementations, based on receiving a beacon message over a short-range communication link from a beacon device 550*a-c*, the mobile devices 502*a-b* can establish communications with one or more servers 530*a-b* via a long-range communication link associated with a base station 512 that provides cellular data services. For example, a beacon message from a beacon device 550*a-c* can cause the mobile devices 502*a-b* to retrieve a retail store application from an application store ("app store") server 530*a*. In some implementations, the mobile devices 502*a-b* have already retrieved and are running the retail store application before receiving the beacon message from the beacon device 550*a-c*. The retail store application can be configured to download beacon message content from a transaction server 530*b*. In some implementations, the retail store application can download beacon message content from the transaction server 530*b* in response to an initial reception of a beacon message such as a welcome beacon message.

In some implementations, the transaction server 530*b* can store data such as beacon message content in a database 535. In some implementations, beacon message content includes mappings between beacon message values (e.g., identifier, major, and/or minor values) and corresponding message data (e.g., text, picture, video, and/or audio). After downloading the beacon message content from the transaction server 530*b*, the mobile devices 502*a-b* can use the mappings and message texts to translate a received beacon message into a format that is suitable for display to users of the mobile devices 502*a-b*. In some implementations, beacon message content can be stored as a document within the database 535 such as an Extensible Markup Language (XML) document or a JSON document. Other document types are possible. In some implementations, the transaction server 530*b* provides the entire beacon message content document to the mobile devices 502*a-b*.

The transaction server 530*b* can store data such as transaction records in a database 535. In some implementations, a mobile device user can use the retail store application to order a product for an in-store pick-up via the transaction server 530*b*. In some implementations, a mobile device user can use the retail store application to arrange for an in-store service appointment via the transaction server 530*b*. Actions, such as ordering a product or arranging service, can cause the transaction server 530*b* to create a transaction record within the database 535. In some implementations, a transaction record can include information such as a user identifier, transaction identifier, product identifier, service identifier, appointment information, payment status, package identifier, fulfillment type (e.g., overnight shipping, ground shipping, in-store pick-up, in-store service appoint, etc.), or a combination thereof.

Based on receiving one or more beacon messages over short-range communication links from one or more beacon devices 550*a-c* of a business establishment, a mobile device 502*a-b* can initiate a background process such as a beacon triggered message exchange with a transaction server 530*b*. For example, the message exchange can include transmitting a user notification message to the transaction server 530*b*. The message exchange can inform the business establishment about an arrival of a customer. During the exchange, the transaction server 530*b* can determine whether an in-store action is required. If an in-store action is required, the transaction server 530*b* can send an in-house notification message to a notification device 540 via WAN 514. In some implementations, the notification device 540 is at a fixed location within the business establishment. In some implementations, the notification device 540, which can be a mobile device such as a tablet device, is held or carried by an employee. In some implementations, the transaction server 530*b* can receive an acknowledgement message from the notification device 540 in regard to the in-house notification message. Based on the acknowledgement message, the transaction server 530*b* can transmit a status message to the mobile device 502*a-b*.

In some implementations, beacon devices 550*a-c* can include circuitry such as a processor, memory, transmitter for broadcasting beacon messages, and an interface for programming the beacon devices 550*a-c*, which can be a USB interface or a two-way wireless interface such as an LTE or IEEE 802.11 based network interface. In some implementations, servers 530*a-b* can include a network interface configured to communicate with devices such as the mobile devices 502*a-b* and the notification device 540. The servers 530*a-b* can include processor electronics configured to communicate with devices such as the mobile devices 502*a-b* via the network interface using a protocol such as Transmission Control Protocol/Internet Protocol (TCP/IP) or User Datagram Protocol (UDP).

Figure 6:
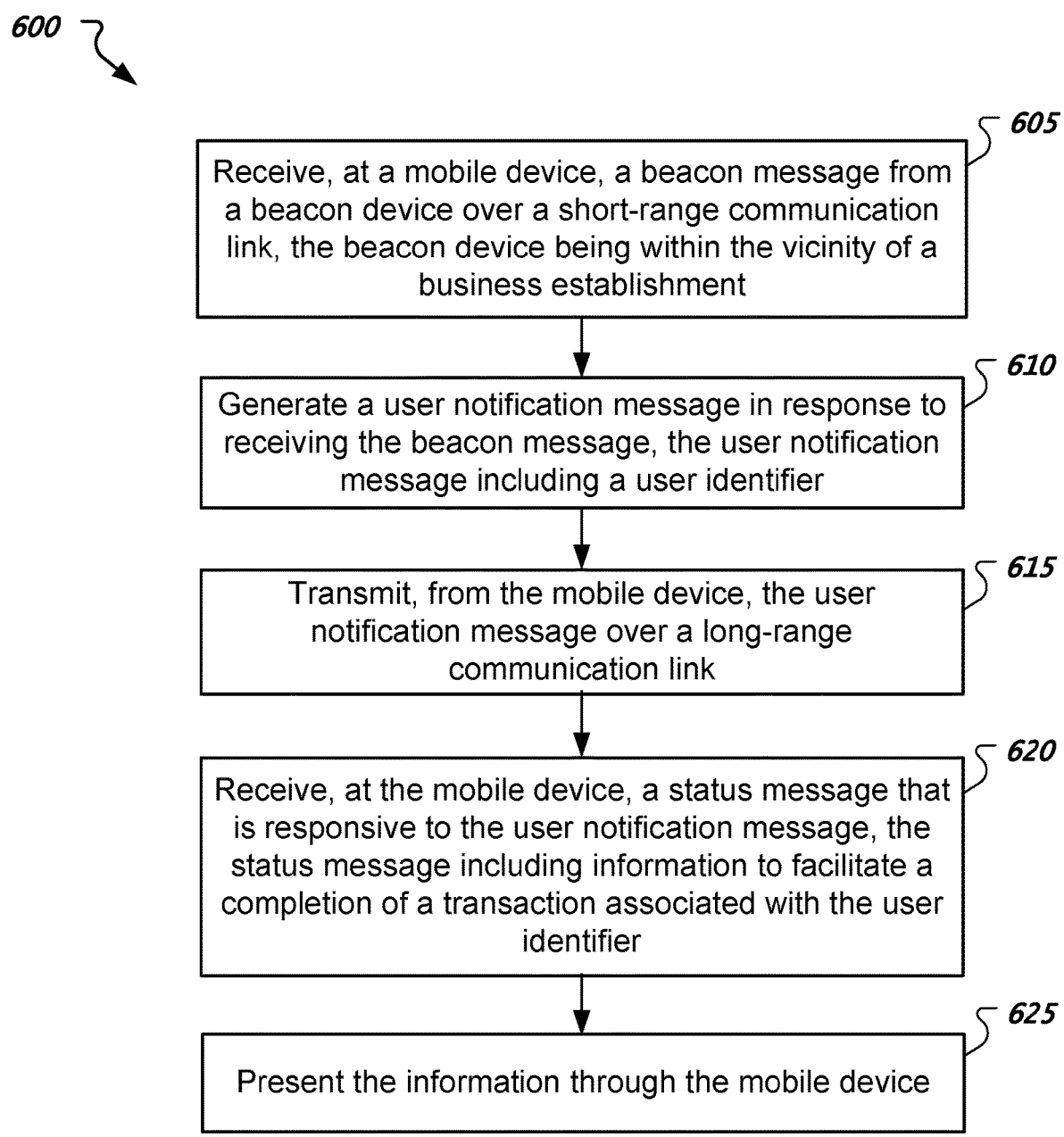
FIG. 6 illustrates an example process performed by a mobile device that performs a beacon triggered message exchange.

FIG. 6 illustrates an example process 600 performed by a mobile device that performs a beacon triggered message exchange. The process 600 can include receiving, at a mobile device, a beacon message from a beacon device over a short-range communication link, the beacon device being within the vicinity of a business establishment (605). The process 600 can include generating a user notification message in response to receiving the beacon message (610). The user notification message can include a user identifier. In some implementations, the user notification message can include a beacon identifier of the received beacon message. In some implementations, the beacon identifier can be used to identify a specific location of the business establishment. In some implementations, the beacon identifier can be used to identify a specific store number of the business establishment. The process 600 can include transmitting, from the mobile device, the user notification message over a long-range communication link (615). In some implementations, the process 600 can include transmitting the user notification message to a server computer outside the vicinity of the business establishment, e.g., a server in a data center. In some implementations, the process 600 can perform a determination of whether there is a pre-existing reason for a visit to the business establishment. If there is a pre-existing reason, the process 600 can proceed to generate and transmit the user notification message. Performing such a determination and selectively generating and transmitting the user notification message can reduce message traffic.

The process 600 can include receiving, at the mobile device, a status message that is responsive to the user notification message (620). The status message can include information to facilitate a completion of a transaction associated with the user identifier. In some implementations, the status message can include an image of an employee that is assigned to facilitate the completion of the transaction. In some implementations, the status message can include barcode data associated with the transaction. A barcode based on the barcode data can be displayed by the mobile device to verify an identity of a person associated with the transaction to an employee of the business establishment. In some implementations, the status message can include customer instructions for completing the transaction. The process 600 can include presenting the information through the mobile device (625). In some implementations, presenting the information can include displaying information such as a text string, image, or video. In some implementations, presenting the information can include producing a notification, e.g., causing a force feedback (e.g., vibration indication), playing audio (e.g., beep, music, etc.), causing a visual indication (e.g., message display, flashing light), or a combination thereof.

Figure 7:
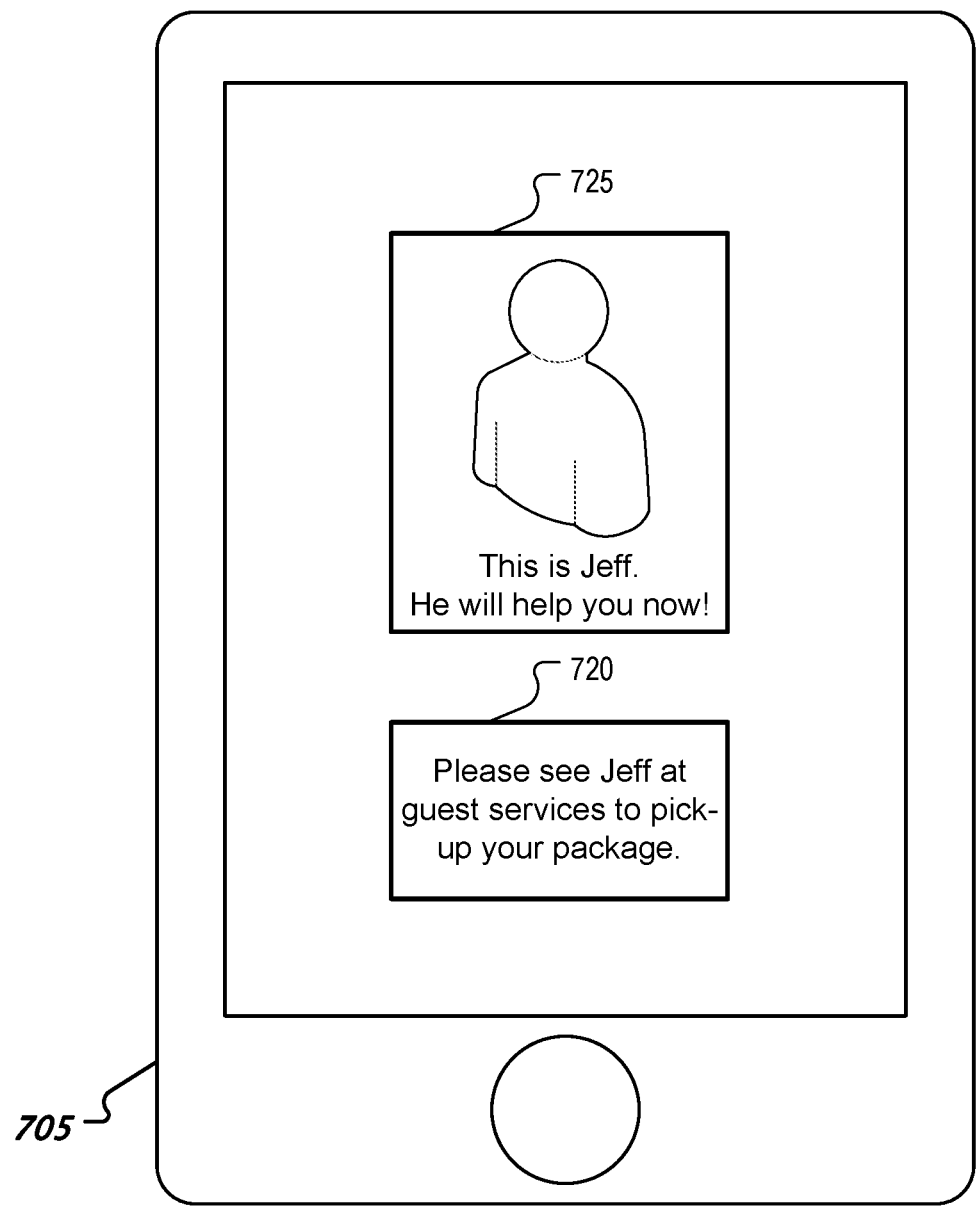
FIG. 7 illustrates an example screenshot of a screen of a mobile device that is displaying information, including an employee headshot, obtained during a beacon triggered message exchange.

FIG. 7 illustrates an example screenshot of a screen of a mobile device 705 that is displaying information, including an employee headshot, obtained during a beacon triggered message exchange. In this example, a user of the mobile device 705 has ordered a product and a package containing the product is ready for pick-up at a retail store. The mobile device 705 can perform a beacon triggered message exchange such as the one associated with FIG. 6. In some implementations, a beacon triggered message exchange can include receiving at the mobile device 705 a message containing information such as an image of a store employee that will be responsible for handling the pick-up, general instructions for pick-up, etc. Based on the beacon triggered message exchange, the mobile device 705 can present information received during the exchange. For example, the mobile device 705 can display in a window 720 on a screen of the mobile device 705 instructions for pick-up (e.g., "Please see Jeff at guest services to pick-up your package"). Further, the mobile device 705 can display in a window 725 on the screen of the mobile device 705 an image of a store employee that will be responsible for handling the pick-up. The window 725 can include the employee image and additional information such as a caption (e.g., "This is Jeff, He will help you now!").

Figure 8:
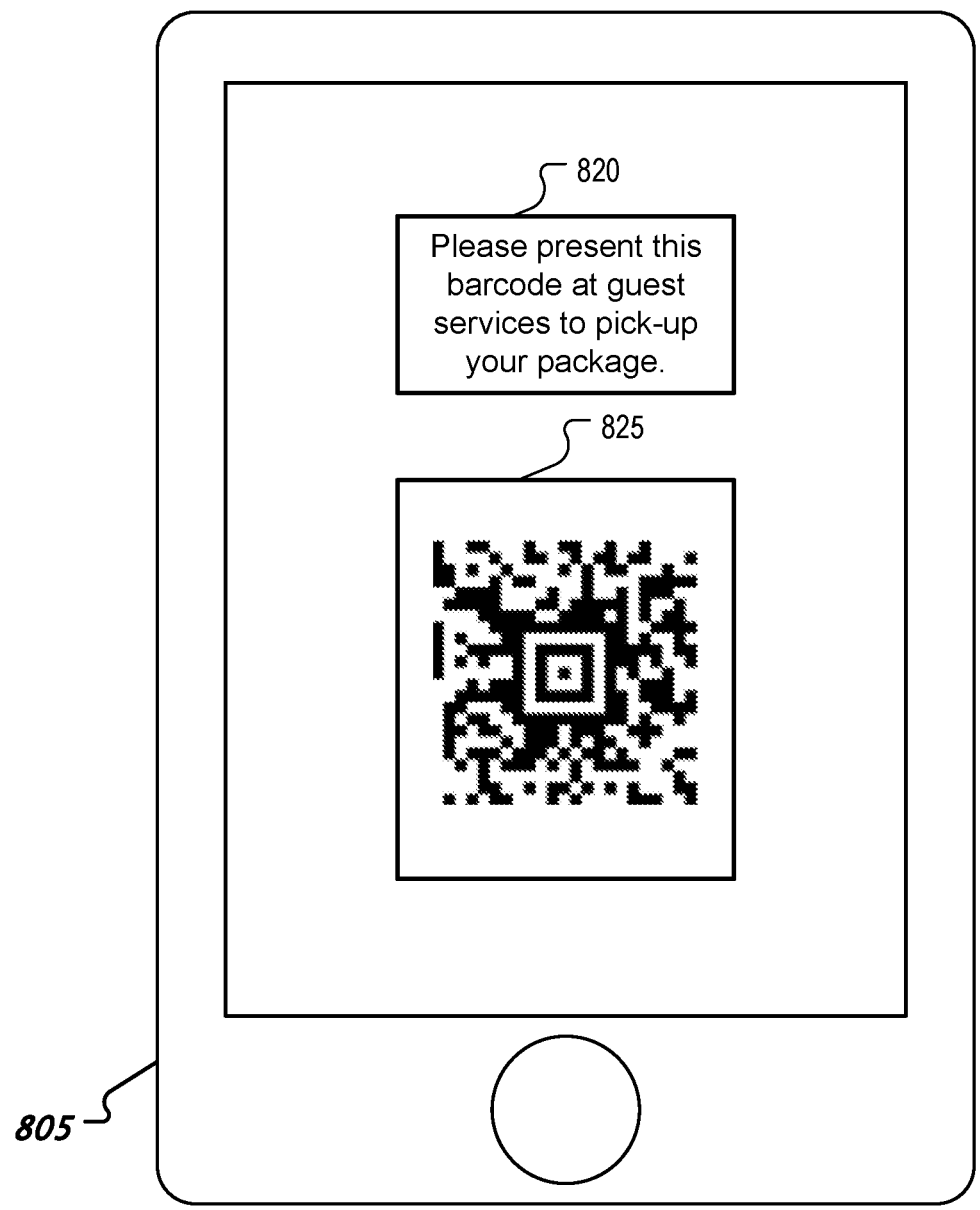
FIG. 8 illustrates an example screenshot of a screen of a mobile device that is displaying a barcode obtained during a beacon triggered message exchange.

FIG. 8 illustrates an example screenshot of a screen of a mobile device 805 that is displaying a barcode obtained during a beacon triggered message exchange. In this example, a user of the mobile device 805 has ordered a product and a package containing the product is ready for pick-up at a retail store. The mobile device 805 can perform a beacon triggered message exchange such as the one associated with FIG. 6. In some implementations, a beacon triggered message exchange can include receiving at the mobile device 805 a message containing information such as barcode data for user verification, general instructions for pick-up, etc. Based on the beacon triggered message exchange, the mobile device 805 can present information received during the exchange. For example, the mobile device 805 can display in a window 820 on a screen of the mobile device 805 instructions for pick-up (e.g., "Please present this barcode at guest services to pick-up your package"). Further, the mobile device 805 can display in a window 825 on the screen of the mobile device 805 a barcode image that corresponds to the barcode data obtained during the exchange. A barcode scanner at a business establishment can scan the barcode image in order to retrieve a transaction associated with the barcode image.

Figure 9:
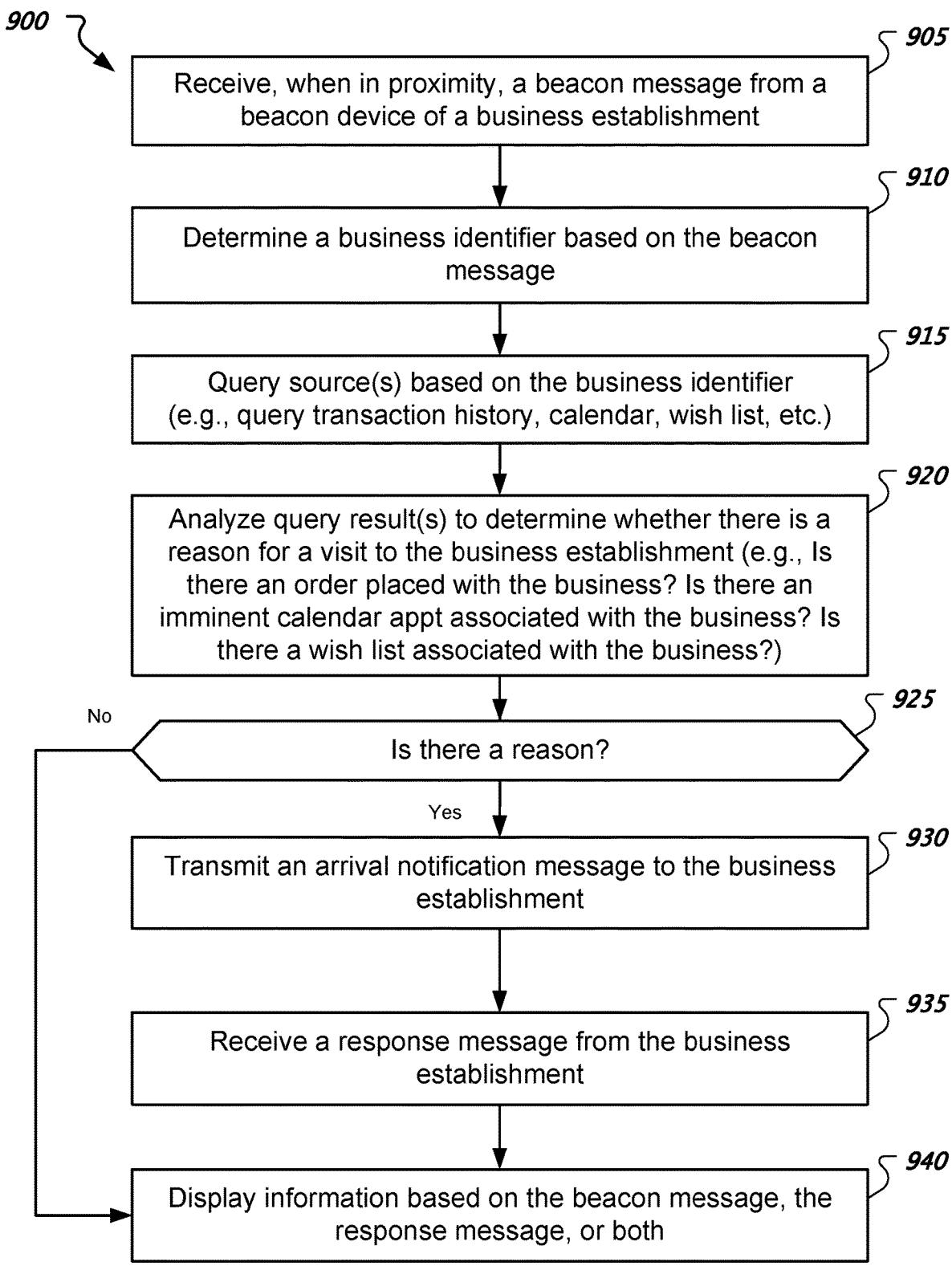
FIG. 9 illustrates another example process performed by a mobile device that performs a beacon triggered message exchange.

FIG. 9 illustrates another example process 900 performed by a mobile device that performs a beacon triggered message exchange. The process 900 can receive, when in proximity, a beacon message from a beacon device of a business establishment (905). The process 900 can determine a business identifier based on the beacon message (910). Determining a business identifier can include extracting a business identifier from a beacon identifier included in the beacon message. In some implementations, a business identifier can include a numerical value corresponding to the business establishment. In some implementations, a business identifier can include a text string that contains a name of the business establishment.

The process 900 can query one or more sources based on the business identifier (915). Various examples of sources include a transaction history, calendar, or wish list. Other types of sources are possible. In some implementations, querying a source can include accessing a data structure to determine whether there is a transaction record(s) associated with the business identifier and retrieving the transaction record(s) if it exists. In some implementations, querying a source can include accessing a calendar application to determine whether there is an imminent calendar appointment associated with the business establishment. In some implementations, querying a source can include accessing a wish list repository and retrieving one or more wish lists associated with the business establishment. A user, for example, can create a wish list via a retail store application and can place one or more products on the wish list. In some implementations, a wish list can be stored as a data structure, such as a table or an array, having one or more product identifiers. In some implementations, a product identifier includes a universal product code (UPC).

The process 900 can analyze one or more query results to determine whether there is a reason for a visit to the business establishment (920). In some implementations, analyzing a query result can include obtaining one or more transaction records and determining whether there is a transaction that has not yet been completed, e.g., a product that has been paid for, but not yet picked-up at the business establishment. In some implementations, analyzing query results can include determining whether there is a calendar appointment that has already started or will start within N minutes, where N is a predetermined value (e.g., 5, 10, or 15 minutes). An existence of a calendar appointment having a location associated with the business establishment together with receiving a beacon message when in a proximity of the business establishment, for example, may indicate that the reason for the visit is due to the appointment. In some implementations, analyzing a query result can include obtaining a wish list associated with the business establishment and determining if there are any relevant products on the wish list that are available for viewing or purchase at the business establishment.

If there is not a reason (925), the process 900 can display information based on the beacon message itself (940). The beacon message, for example, can include a welcome text. The welcome text can be displayed on a screen of the mobile device.

If there is a reason (925), the process 900 can transmit an arrival notification message to the business establishment (930). An arrival notification message can include a message code (e.g., an arrival notification type), a user identifier associated with a user of the mobile device, or both. In some implementations, such a message can include a transaction identifier. In some implementations, such a message can include a product identifier (e.g., a product identifier from a wish list). In some implementations, such a message can include a reason code (e.g., pick-up, scheduled appointment, general product inquiry, etc.) that is based on a reason determined by the process 900.

The process 900 can receive a response message from the business establishment (935). A response message can include information such as a confirmation code, instructions (e.g., pick-up instructions, meeting instructions), order instructions, barcode data associated with a transaction, or an image of an employee that will handle a transaction, or a combination thereof. In some implementations, a message can include one or more message parts which can be sent via one or more network packets.

The process 900 can display information based on the beacon message, the response message, or both (940). In some implementations, information corresponding to the beacon message can be displayed, and later, information included in the response message can be displayed.

Figure 10:
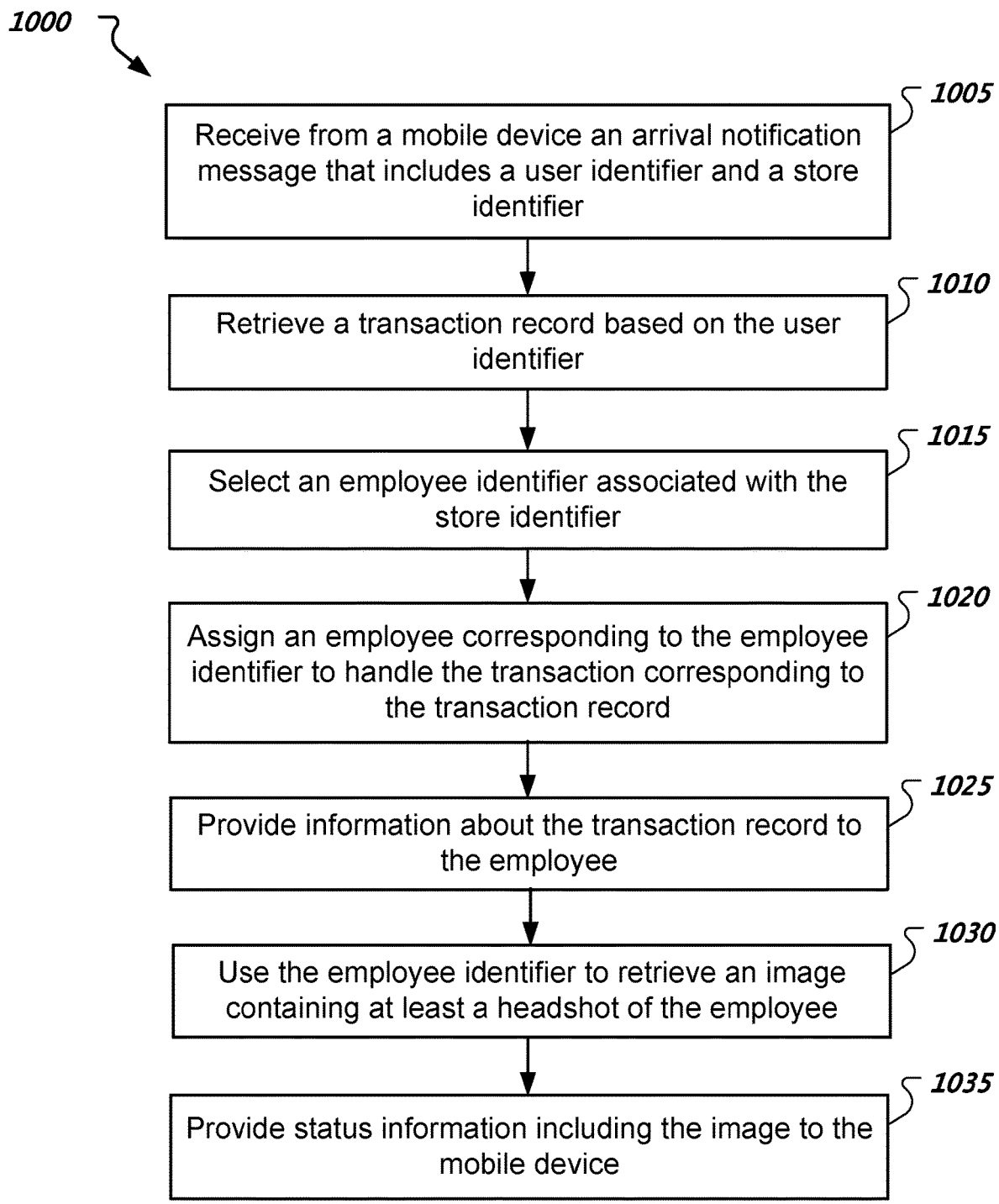
FIG. 10 illustrates an example process performed by a server that performs an employee assignment procedure associated with a beacon triggered message exchange.

FIG. 10 illustrates an example process 1000 performed by a server that performs an employee assignment procedure associated with a beacon triggered message exchange. The process 1000 can receive from a mobile device an arrival notification message that includes a user identifier and a store identifier (1005). In some implementations, an arrival notification message can include a mobile device identifier, and the process 1000 can determine a user identifier based on a mobile device identifier. The process 1000 can retrieve a transaction record based on the user identifier (1010). The process 1000 can select an employee identifier associated with the store identifier (1015). Selecting an employee identifier can include querying an employee database for one or more employees that are currently on-duty within a business establishment location corresponding to the store identifier. Selecting an employee identifier can include using an employee task assignment database to identify an on-duty employee that is currently available to help or will be available to help. In some implementations, selecting an employee identifier can include accessing location information from a tracking device on one or more employee's badges, determining a proximity of the one or more employees to a location such as a stockroom or a customer service center, and selecting the closest employee. The process 1000 can assign an employee corresponding to the employee identifier to handle the transaction corresponding to the transaction record (1020). Assigning an employee can include setting a busy flag within an employee record of an employee task assignment database and setting an estimated time of completion.

The process 1000 can provide information about the transaction record to the employee (1025). Providing information about the transaction record to the employee can include transmitting an assignment message to an employee device, such as a tablet computer, mobile computer, or paging device, to inform about the assignment. The assignment message can include one or more details about the transaction record such as a product identifier for a product that has been purchased. The assignment message can include one or more instructions for the employee to follow such as an instruction to obtain a product from a stockroom and prepare it for pick-up. Providing information about the transaction record to the employee can include providing a store floor map and customer location to the employee to help the employee find and greet the customer.

The process 1000 can use the employee identifier to retrieve an image containing at least a headshot of the employee (1030). The process 1000 can provide status information including the image to the mobile device (1035). Providing status information can include transmitting a file containing the image. Providing status information can include transmitting a current order status associated with the transaction identifier. Providing status information can include transmitting order pick-up instructions.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, at a mobile device when the mobile device is within a connection range of a beacon device that is within a vicinity of an establishment, a beacon message from a beacon device;
generating a first message in response to receiving the beacon message, the first message comprising a user or mobile device identifier;
transmitting, from the mobile device, the first message to a server computer outside the vicinity of the establishment, wherein the first message is configured to cause the establishment to dispatch an employee to prepare for an arrival of a user of the mobile device and handle a transaction associated with the user or mobile device identifier;
receiving, at the mobile device, a second message that is responsive to the first message, the second message comprising information to facilitate a completion of the transaction; and
presenting, by the mobile device, the information for use by the user to complete the transaction.

2. The method of claim 1, wherein the information comprises an image of an employee that is assigned to facilitate the completion of the transaction, and wherein presenting the information comprises displaying at least a portion of the image.

3. The method of claim 1, wherein the information comprises barcode data, and wherein presenting the information comprises displaying a barcode based on the barcode data to verify an identity of a user associated with the mobile device.

4. The method of claim 1, wherein the information comprises customer instructions for completing the transaction, and wherein presenting the information comprises displaying the customer instructions.

5. The method of claim 1, wherein the beacon message comprises a beacon identifier, and wherein the first message comprises at least a portion of the beacon identifier.

6. The method of claim 1, comprising:
performing a determination of whether there is a pre-existing reason for a visit to the establishment by querying one or more sources on the mobile device, wherein generating the first message is conditional on an outcome of the determination.

7. A system, comprising:
a network interface configured to communicate with mobile devices; and
processor electronics configured to store applications, including an application, for download to the mobile devices via the network interface,
wherein the application comprises instructions to cause a mobile device to perform operations comprising:
receiving a beacon message when the mobile device is within a connection range of a beacon device that is within the vicinity of an establishment;
generating a first message in response to receiving the beacon message, the first message comprising a user or mobile device identifier;
transmitting the first message to a server computer outside the vicinity of the establishment, wherein the first message is configured to cause the establishment to dispatch an employee to prepare for an arrival of a user of the mobile device and handle a transaction associated with the user or mobile device identifier;
receiving a second message that is responsive to the first message, the second message comprising information to facilitate a completion of the transaction; and
presenting the information through the mobile device for use by the user to complete the transaction.

8. The system of claim 7, wherein the information comprises an image of an employee that is assigned to facilitate the completion of the transaction, and wherein presenting the information comprises displaying at least a portion of the image.

9. The system of claim 7, wherein the information comprises barcode data, and wherein presenting the information comprises displaying a barcode based on the barcode data to verify an identity of a user associated with the mobile device.

10. The system of claim 7, wherein the information comprises customer instructions for completing the transaction, and wherein presenting the information comprises displaying the customer instructions.

11. The system of claim 7, wherein the beacon message comprises a beacon identifier, and wherein the first message comprises at least a portion of the beacon identifier.

12. The system of claim 7, wherein the operations comprise:
performing a determination of whether there is a pre-existing reason for a visit to the establishment by querying one or more sources on the mobile device, wherein generating the first message is conditional on an outcome of the determination.

13. The method of claim 1, wherein the range is between 10 and 30 meters.

14. The method of claim 1, wherein the mobile device is to communicatively couple with the beacon device when the user has entered or is about to enter the establishment.

15. The system of claim 7, wherein the range is between 10 and 30 meters.

16. The system of claim 7, wherein the mobile device is to communicatively couple with the beacon device when the user has entered or is about to enter the establishment.

* * * * *